Jan. 9, 1934.  J. P. SPANG  1,942,500
MACHINE FOR SLITTING MEAT, VEGETABLES, AND THE LIKE
Filed Jan. 21, 1932
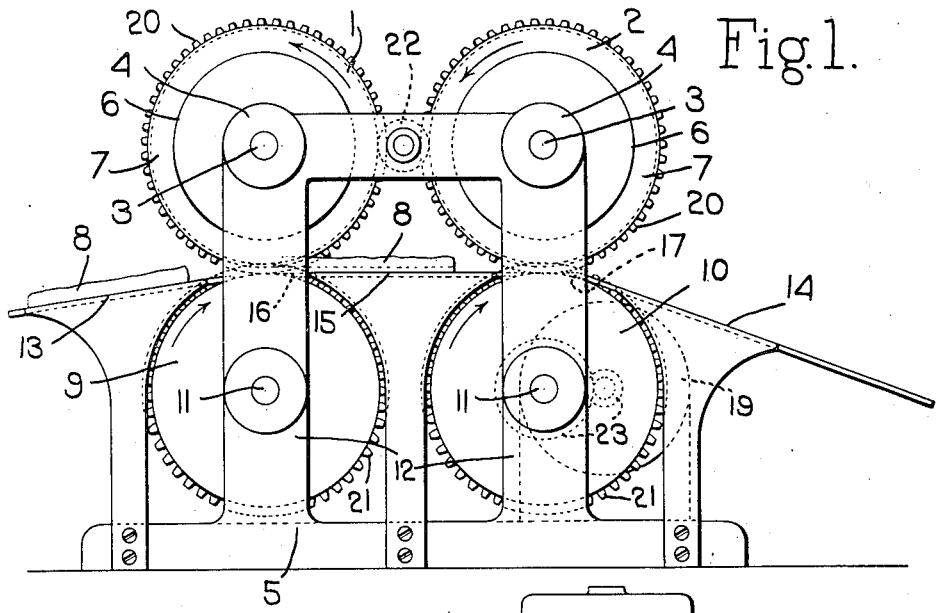
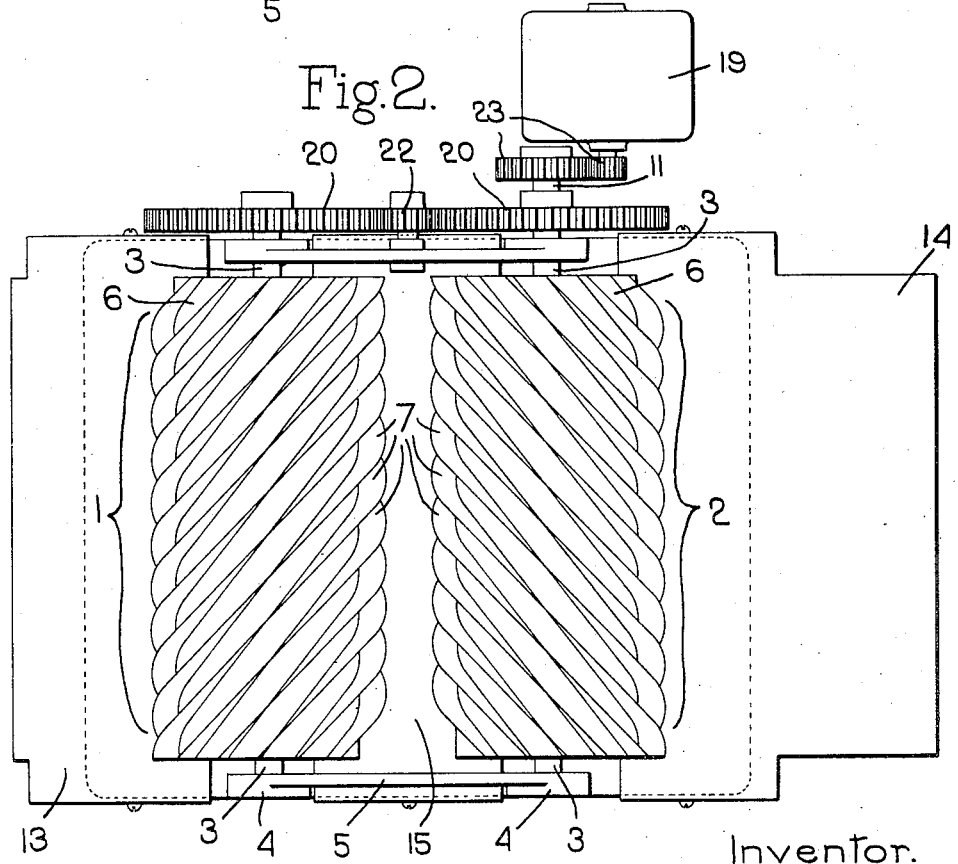
Inventor.
Joseph P. Spang
by Heard Smith & Tennant.
Attys.

Patented Jan. 9, 1934

1,942,500

UNITED STATES PATENT OFFICE 1,942,500

MACHINE FOR SLITTING MEAT, VEGETABLES, AND THE LIKE

Joseph P. Spang, Quincy, Mass.

Application January 21, 1932. Serial No. 587,900

2 Claims. (Cl. 17—26)

This invention relates to a machine for slitting meats, vegetables and the like and particularly to a machine of this class which is constructed to cut two groups of parallalel slits in the meat or other material to be slit with the slits of one group crossing those of the other.

One of the objects of the invention is to provide a novel machine of this type by which the cutting of the two groups of parallel slits is made at one pass of the cutting knives across the meat or other material to be slit, thereby facilitating the slitting operation.

Another object of the invention is to provide a novel slitting machine of this type which is simple in construction and which is well adapted for power operation.

In order to give an understanding of the invention I have illustrated in the drawing a selected embodiment thereof which is specially designed for slitting meat although it will be understood that with appropriate modifications the invention is equally adapted for slitting vegetables and other articles of food.

Fig. 1 is a side view of a machine embodying the invention;

Fig. 2 is a top plan view.

My improved meat-slitting machine includes a pair of rotary knife elements, preferably having a tandem arrangement and each provided on its periphery with a spirally-arranged cutting blade, the cutting blades of the two knife elements being spiraled in opposite directions.

The slitting of the meat is accomplished by passing the meat across the knives or passing the knives across the meat, one knife operating to cut one series of parallel slits in the meat and the other knife operating to cut another series of parallel slits which cross or intersect the slits of the first series. The slitting operation is accomplished in such a way that the slits are not cut clear through the meat, so that the portions of meat between the intersecting slits are all connected by a film of meat on one face of the slice.

In the drawing 1 and 2 indicate the two rotary knife elements. These knife elements are mounted on shafts 3 which are journalled in suitable bearings 4 carried by the supporting frame 5. Each knife element has a cylindrical body 6 on the periphery of which is one or more spirally-arranged blade elements 7. These blades 7 extend a distance beyond the body 6 greater than the thickness of the slice 8 of meat which is to be slit. These blades 7 may be secured to the body 6 in any appropriate way and each cutting element thus presents on its surface a plurality of parallel cutting blades which extend spirally around the cutting element. The blades of the two rolls are preferably arranged to spiral in opposite directions as shown in the drawing.

Suitable means are provided for passing the slice 8 of meat to be cut across the cutting elements so that the latter will act on the meat to cut slits therein. In the construction shown the device is provided with a supporting platform or table and with means for passing the meat 8 across the knife elements 1 and 2.

While any appropriate means for producing the relative feeding movement between the meat 8 and the knives may be employed I have herein shown a feed roll associated with each knife element, each feed roll co-operating with its knife element to feed the meat forward. These feed rolls are indicated at 9 and 10 respectively and they are mounted on shafts 11 journalled in uprights 12 of the frame 5. For convenience I prefer also to provide the machine with a receiving table or platform 13 on which the slice of meat may be placed as it is fed into the machine and with a delivery table or platform 14 onto which the slit meat is delivered. I may also, if desired, employ an intermediate platform 15 which supports the meat as it is carried from one cutting element to another.

The feed rolls and the cutting element may be rotated in any suitable way, the rotation being in the direction of the arrows.

The slitting of a slice of meat 8 is accomplished by placing said slice on a receiving platform 13 and feeding it between the roll 9 and the knife 1. This roll and knife co-operate to carry the meat forward from the receiving platform 13 onto the intermediate platform 15 and as the meat passes between the roll 9 and the knife element 1 the spiral blades 7 will cut parallel slits diagonally in the upper face of the meat. These slits, however, are not cut clear through the meat because the feed roll and the knife element 1 are so disposed relative to each other that the edge of any blade, when in slit-cutting position, is spaced slightly from the surface of the feed roll.

After passing between the feed roll 9 and the knife element 1 the meat then is fed between the feed roll 10 and the knife element 2, and the blades 7 of the knife element 2 cut an additional series of diagonal slits in the meat. Because of the fact that the blades of the knife element 2 spiral in an opposite direction from those of the knife element 1 the slits which are cut by the blades of the knife element 2 will cross those formed by the blades of the knife element 1 and when the meat is received on the platform 14 it will have two series of parallel slits cut in its upper face and the slits of one series will cross or intersect those of the other series, thereby providing the meat with an increased cooking surface.

The front edge 16 of the platform 15 and the edge 17 of the platform 14 will preferably be made to function as a scraper to prevent the meat from sticking to the feed rolls 9 and 10.

The cutting elements and the rolls may be driven by any suitable means either manually or by power. As herein shown I have illustrated a motor 19 from which both the knife element and the rolls may be driven. Each knife element is geared to its feed roll by means of suitable gears 20 and 21 carried on the shafts 3 and 11 respectively and the two cutting elements are also geared together through the medium of an intermediate gear 22.

The motor 19 is shown as geared to one of the roll shafts 11 through suitable gearing 23. An advantage of this construction is that the forming of the two groups of slits in the meat can be accomplished by one pass of the meat across the knives, thereby obviating the delay involved in that type of meat-slitting machine in which it is necessary to cut one series of slits and then to turn the meat before cutting the other series of slits.

Although the invention has been above described as embodied in a machine designed for slitting slices of meat yet it will be obvious that the principal features of the invention can be equally well embodied in a machine designed for slitting vegetables, slices of bread or other articles of food and hence I do not wish to be limited in the application of the invention to the slitting of meat.

I claim:

1. In a machine for slitting meat, the combination with a frame having a receiving platform, a delivery platform, and an intermediate platform situated between the receiving platform and the delivery platform and spaced from both, of a feed roll between the receiving platform and the intermediate platform, a second feed roll between the intermediate platform and the delivery platform, a rotary knife element rotatively mounted in the frame above each feed roll, each knife element having a plurality of cutting blades extending spirally about its periphery, the blades of each element being spaced slightly from the corresponding feed roll, means gearing the feed rolls and knife elements together, and means for rotating said rolls and knife elements.

2. In a machine for slitting meat, the combination with a frame having a receiving platform, a delivery platform, and an intermediate platform situated between the receiving platform and the delivery platform and spaced from both, of a feed roll between the receiving platform and the intermediate platform, a second feed roll between the intermediate platform and the delivery platform, a rotary knife element rotatively mounted in the frame above each feed roll, each knife element having a plurality of cutting blades extending spirally about its periphery, the blades of each element being spaced slightly from the corresponding feed roll, means gearing the feed rolls and knife elements together, and means for rotating said rolls and knife elements, the blade on one knife element spiralling in an opposite direction from that on the other knife element.

JOSEPH P. SPANG.